United States Patent
Schwebke et al.

(10) Patent No.: US 10,880,272 B2
(45) Date of Patent: Dec. 29, 2020

(54) SECURE SOFTWARE CLIENT

(71) Applicant: Wyse Technology L.L.C., Santa Clara, CA (US)

(72) Inventors: Curtis Schwebke, Los Gatos, CA (US); Evren Bingol, San Francisco, CA (US)

(73) Assignee: Wyse Technology L.L.C., Santa Clara, CA (US)

(*) Notice: Subject to any disclaimer, the term of this patent is extended or adjusted under 35 U.S.C. 154(b) by 328 days.

(21) Appl. No.: 15/493,124

(22) Filed: Apr. 20, 2017

(65) Prior Publication Data
US 2018/0309728 A1    Oct. 25, 2018

(51) Int. Cl.
*H04L 29/06* (2006.01)
*G06F 9/451* (2018.01)

(52) U.S. Cl.
CPC .......... *H04L 63/0281* (2013.01); *G06F 9/452* (2018.02); *H04L 63/0272* (2013.01)

(58) Field of Classification Search
CPC . H04L 63/0281; H04L 63/0272; H04L 63/08; G06F 9/452
USPC ............................ 726/3; 709/203; 715/234
See application file for complete search history.

(56) References Cited

U.S. PATENT DOCUMENTS

| | | | | |
|---|---|---|---|---|
| 6,714,975 B1 * | 3/2004 | Aggarwal | ............. | G06Q 30/02 709/224 |
| 6,763,040 B1 * | 7/2004 | Hite | ....................... | H04L 29/06 370/362 |
| 7,133,904 B1 * | 11/2006 | Sohya | ................. | H04L 67/2823 709/218 |
| 7,584,500 B2 * | 9/2009 | Dillon | ................. | H04L 63/0464 726/3 |

(Continued)

FOREIGN PATENT DOCUMENTS

| | | | | |
|---|---|---|---|---|
| JP | 2001292173 A | * | 10/2001 | ......... G06F 16/9574 |
| KR | 20060028526 A | * | 3/2006 | |

OTHER PUBLICATIONS

Basney, Jim, Rion Dooley, Jeff Gaynor, Suresh Marru, and Marlon Pierce. "Distributed web security for science gateways." in Proceedings of the 2011 ACM workshop on Gateway computing environments, pp. 13-20. ACM, 2011. (Year: 2011).*

(Continued)

*Primary Examiner* — Luu T Pham
*Assistant Examiner* — Walter J Malinowski
(74) *Attorney, Agent, or Firm* — Kirton McConkie; Brian Tucker

(57) ABSTRACT

A secure software client is provided. A secure software client can be partitioned into a web application that functions as the user interface and a proxy that performs a number of functions to provide a desktop-like experience within the web application. The web application can be isolated within the browser and can communicate with the proxy via a (Continued)

secure communication channel thereby allowing the proxy to be isolated from other types of access. The proxy can generate a desktop in the form of HTML5 content that the web application can render. The proxy can customize the desktop to include representations of applications or other functionality that are available to the user. The web application can detect user interaction with the HTML5 content and relay the interaction to the proxy via the secure communication channel to allow the proxy to perform an appropriate function.

13 Claims, 14 Drawing Sheets

(56) References Cited

U.S. PATENT DOCUMENTS

| | | | | |
|---|---|---|---|---|
| 7,930,304 B1* | 4/2011 | Rainwater | G06F 16/9535 | 707/748 |
| 8,266,544 B1* | 9/2012 | Kay | G06F 21/53 | 715/808 |
| 8,756,696 B1* | 6/2014 | Miller | H04L 63/14 | 709/247 |
| 10,049,349 B1* | 8/2018 | Grassadonia | G06Q 20/10 | |
| 10,089,093 B1* | 10/2018 | Saraf | G06F 8/61 | |
| 10,244,020 B1* | 3/2019 | Colton | H04L 67/02 | |
| 10,255,445 B1* | 4/2019 | Brinskelle | H04L 63/101 | |
| 10,318,320 B1* | 6/2019 | Thomas | H04L 67/025 | |
| 2002/0026507 A1* | 2/2002 | Sears | H04L 41/22 | 709/224 |
| 2002/0062417 A1* | 5/2002 | Rudland | H04L 12/2805 | 710/306 |
| 2002/0122054 A1* | 9/2002 | Hind | G06F 16/986 | 715/731 |
| 2002/0147611 A1* | 10/2002 | Greene | G06Q 10/063112 | 705/1.1 |
| 2002/0188594 A1* | 12/2002 | Kulp | G06F 9/5044 | |
| 2002/0198965 A1* | 12/2002 | Kraft | G06F 21/31 | 709/219 |
| 2003/0084104 A1* | 5/2003 | Salem | H04L 29/06 | 709/205 |
| 2003/0097361 A1* | 5/2003 | Huang | G06Q 10/107 | |
| 2005/0262220 A1* | 11/2005 | Ecklund | H04L 67/2823 | 709/219 |
| 2006/0200779 A1* | 9/2006 | Taylor | G06F 3/0481 | 715/781 |
| 2006/0253874 A1* | 11/2006 | Stark | G06F 3/038 | 725/62 |
| 2006/0294196 A1* | 12/2006 | Feirouz | G06F 21/41 | 709/217 |
| 2007/0192727 A1* | 8/2007 | Finley | G06F 3/04815 | 715/781 |
| 2007/0204166 A1* | 8/2007 | Tome | H04L 63/0823 | 713/182 |
| 2007/0238416 A1* | 10/2007 | Williams | A61N 1/08 | 455/67.11 |
| 2007/0239859 A1* | 10/2007 | Wilkinson | H04L 61/1523 | 709/220 |
| 2007/0288247 A1* | 12/2007 | Mackay | G06F 16/113 | 705/1.1 |
| 2008/0016516 A1* | 1/2008 | Brunswig | G06F 9/54 | 719/315 |
| 2008/0072244 A1* | 3/2008 | Eker | G06F 9/548 | 719/330 |
| 2008/0148156 A1* | 6/2008 | Brewer | G06Q 30/02 | 715/738 |
| 2008/0155557 A1* | 6/2008 | Bezrukov | G06F 9/541 | 719/316 |
| 2008/0282338 A1* | 11/2008 | Beer | G06F 21/566 | 726/12 |
| 2008/0307067 A1* | 12/2008 | Cisler | H04L 63/0272 | 709/218 |
| 2008/0307219 A1* | 12/2008 | Karandikar | H04L 63/166 | 713/153 |
| 2009/0241110 A1* | 9/2009 | Heo | G06F 9/45537 | 718/1 |
| 2009/0259572 A1* | 10/2009 | Lay | G06Q 10/087 | 705/28 |
| 2009/0320050 A1* | 12/2009 | Pousti | G06Q 10/10 | 719/328 |
| 2010/0100853 A1* | 4/2010 | Ciudad | G06F 3/012 | 715/856 |
| 2010/0138744 A1* | 6/2010 | Kamay | G06F 9/452 | 715/716 |
| 2010/0144314 A1* | 6/2010 | Sherkin | G06F 21/33 | 455/411 |
| 2010/0154050 A1* | 6/2010 | Mukkara | H04L 12/4641 | 726/15 |
| 2010/0162338 A1* | 6/2010 | Makhija | H04N 21/2402 | 725/114 |
| 2010/0305722 A1* | 12/2010 | Jin | H04L 12/2818 | 700/90 |
| 2010/0332453 A1* | 12/2010 | Prahlad | G06F 11/1469 | 707/640 |
| 2011/0022986 A1* | 1/2011 | Dumais | G06F 8/60 | 715/835 |
| 2011/0035692 A1* | 2/2011 | Sandone | G11B 27/034 | 715/769 |
| 2011/0047187 A1* | 2/2011 | Sinha | G06F 9/543 | 707/802 |
| 2011/0055256 A1* | 3/2011 | Phillips | G10L 15/30 | 707/769 |
| 2011/0107327 A1* | 5/2011 | Barkie | G06F 8/63 | 717/176 |
| 2011/0126213 A1* | 5/2011 | Macken | G06F 9/54 | 719/313 |
| 2011/0277027 A1* | 11/2011 | Hayton | H04L 63/0815 | 726/8 |
| 2012/0084663 A1* | 4/2012 | Momchilov | G06F 3/0481 | 715/744 |
| 2012/0084854 A1* | 4/2012 | Mualem | G06F 21/36 | 726/18 |
| 2012/0188340 A1* | 7/2012 | Kawaguchi | H04N 13/167 | 348/43 |
| 2012/0226998 A1* | 9/2012 | Friedl | H04L 65/1069 | 715/760 |
| 2012/0227076 A1* | 9/2012 | McCoy | H04N 21/2387 | 725/110 |
| 2012/0324365 A1* | 12/2012 | Momchilov | G06F 9/54 | 715/738 |
| 2013/0060856 A1* | 3/2013 | Fried | G06Q 10/10 | 709/204 |
| 2013/0104051 A1* | 4/2013 | Reeves | G06F 1/1616 | 715/748 |
| 2013/0204867 A1* | 8/2013 | Lim | G06F 16/24578 | 707/723 |
| 2013/0212462 A1* | 8/2013 | Athas | H04L 67/10 | 715/234 |
| 2013/0219262 A1* | 8/2013 | Becker | G06F 17/2247 | 715/234 |
| 2013/0254850 A1* | 9/2013 | Alison | H04W 4/21 | 726/4 |
| 2013/0297498 A1* | 11/2013 | Nazaret | G06Q 20/14 | 705/40 |
| 2013/0318524 A1* | 11/2013 | Agarwal | G06F 9/455 | 718/1 |
| 2014/0007040 A1* | 1/2014 | Zhong | G06F 9/5027 | 717/104 |
| 2014/0046695 A1* | 2/2014 | Meyer | G16H 10/60 | 705/3 |
| 2014/0082511 A1* | 3/2014 | Weissberg | G06F 9/452 | 715/740 |
| 2014/0108274 A1* | 4/2014 | Sherfey | G06Q 40/02 | 705/311 |
| 2014/0136944 A1* | 5/2014 | Harris | G06F 17/211 | 715/234 |
| 2014/0169762 A1* | 6/2014 | Ryu | G11B 20/00086 | 386/259 |

(56) References Cited

U.S. PATENT DOCUMENTS

| | | | | |
|---|---|---|---|---|
| 2014/0189792 A1* | 7/2014 | Lesavich | H04L 63/10 | 726/3 |
| 2014/0195894 A1* | 7/2014 | Sharma | G06F 16/9577 | 715/234 |
| 2014/0198112 A1* | 7/2014 | Miyamoto | G06T 1/20 | 345/522 |
| 2014/0207863 A1* | 7/2014 | Steinberg | H04L 67/34 | 709/204 |
| 2014/0215310 A1* | 7/2014 | Kim | G06F 3/04883 | 715/234 |
| 2014/0304322 A1* | 10/2014 | Dey | H04L 67/141 | 709/203 |
| 2014/0344945 A1* | 11/2014 | Buer | G06F 21/73 | 726/26 |
| 2014/0379913 A1* | 12/2014 | Niimura | H04L 67/34 | 709/225 |
| 2015/0026305 A1* | 1/2015 | Takushima | G06F 9/54 | 709/219 |
| 2015/0052420 A1* | 2/2015 | Churchwell | G09B 5/00 | 715/205 |
| 2015/0086012 A1* | 3/2015 | Chhabra | H04N 21/4122 | 380/200 |
| 2015/0154784 A1* | 6/2015 | Hensel | G06T 13/80 | 345/672 |
| 2015/0181390 A1* | 6/2015 | Williams | H04W 4/90 | 455/456.3 |
| 2015/0193285 A1* | 7/2015 | Hamzata | G06F 9/5011 | 719/313 |
| 2015/0242223 A1* | 8/2015 | Liu | G06F 9/548 | 718/1 |
| 2015/0341518 A1* | 11/2015 | Shimizu | G06F 9/44 | 358/1.15 |
| 2015/0346931 A1* | 12/2015 | Moran | G06F 3/0484 | 715/740 |
| 2016/0029079 A1* | 1/2016 | Zhou | H04N 21/4437 | 725/109 |
| 2016/0048485 A1* | 2/2016 | Sherwood | G06F 17/2247 | 715/234 |
| 2016/0100025 A1* | 4/2016 | Ebner | G06F 16/9566 | 709/203 |
| 2016/0112528 A1* | 4/2016 | Chen | H04L 67/10 | 709/203 |
| 2016/0132311 A1* | 5/2016 | Beckman | H04L 67/06 | 717/177 |
| 2016/0142497 A1* | 5/2016 | Ullrich | H04W 4/043 | 715/738 |
| 2016/0162127 A1* | 6/2016 | Sepulveda | G06F 3/04817 | 715/777 |
| 2016/0321116 A1* | 11/2016 | Schwartz, Jr. | G06F 9/4406 | |
| 2016/0364201 A1* | 12/2016 | Beveridge | G06F 3/1454 | |
| 2016/0378535 A1* | 12/2016 | Oh | G06F 9/4451 | 718/1 |
| 2017/0006034 A1* | 1/2017 | Link, II | H04L 61/2592 | |
| 2017/0034292 A1* | 2/2017 | George | H04L 67/22 | |
| 2017/0126903 A1* | 5/2017 | Cohen | H04L 67/28 | |
| 2017/0185626 A1* | 6/2017 | Tu | G06F 16/176 | |
| 2017/0289269 A1* | 10/2017 | Bell | H04L 12/4633 | |
| 2017/0289292 A1* | 10/2017 | Arning | H04L 67/2823 | |
| 2017/0289293 A1* | 10/2017 | Rubtsov | H04L 67/2823 | |
| 2017/0289809 A1* | 10/2017 | Smith | H04W 12/06 | |
| 2017/0295236 A1* | 10/2017 | Kulkarni | H04L 67/1097 | |
| 2017/0300316 A1* | 10/2017 | Lopyrev | H04L 67/1097 | |
| 2017/0346894 A1* | 11/2017 | Zhang | H04L 67/1095 | |
| 2018/0007207 A1* | 1/2018 | Adams | H04L 67/02 | |
| 2018/0025503 A1* | 1/2018 | Tsai | G06F 17/2247 | 382/100 |
| 2018/0157407 A1* | 6/2018 | Buettner | G06F 3/04883 | |
| 2018/0191709 A1* | 7/2018 | Thayer | H04L 63/0823 | |
| 2018/0213349 A1* | 7/2018 | Panje | H04L 67/12 | |
| 2018/0308087 A1* | 10/2018 | Maimon | G06F 8/60 | |
| 2019/0268178 A1* | 8/2019 | Fairweather | H04L 12/40032 | |

OTHER PUBLICATIONS

Amoroso, Edward. "Practical Methods for Securing the Cloud." IEEE cloud computing 1, No. 1 (2014): 28-38. (Year: 2014).*

Sjösten, Alexander, Steven Van Acker, and Andrei Sabelfeld. "Discovering browser extensions via web accessible resources." in Proceedings of the Seventh ACM on Conference on Data and Application Security and Privacy, pp. 329-336. 2017. (Year: 2017).*

Ahmadinejad, Seyed Hossein, Mohd Anwar, and Philip WL Fong. "Inference attacks by third-party extensions to social network systems." in 2011 IEEE International Conference on Pervasive Computing and Communications Workshops (PERCOM Workshops), pp. 282-287. IEEE, 2011. (Year: 2011).*

* cited by examiner

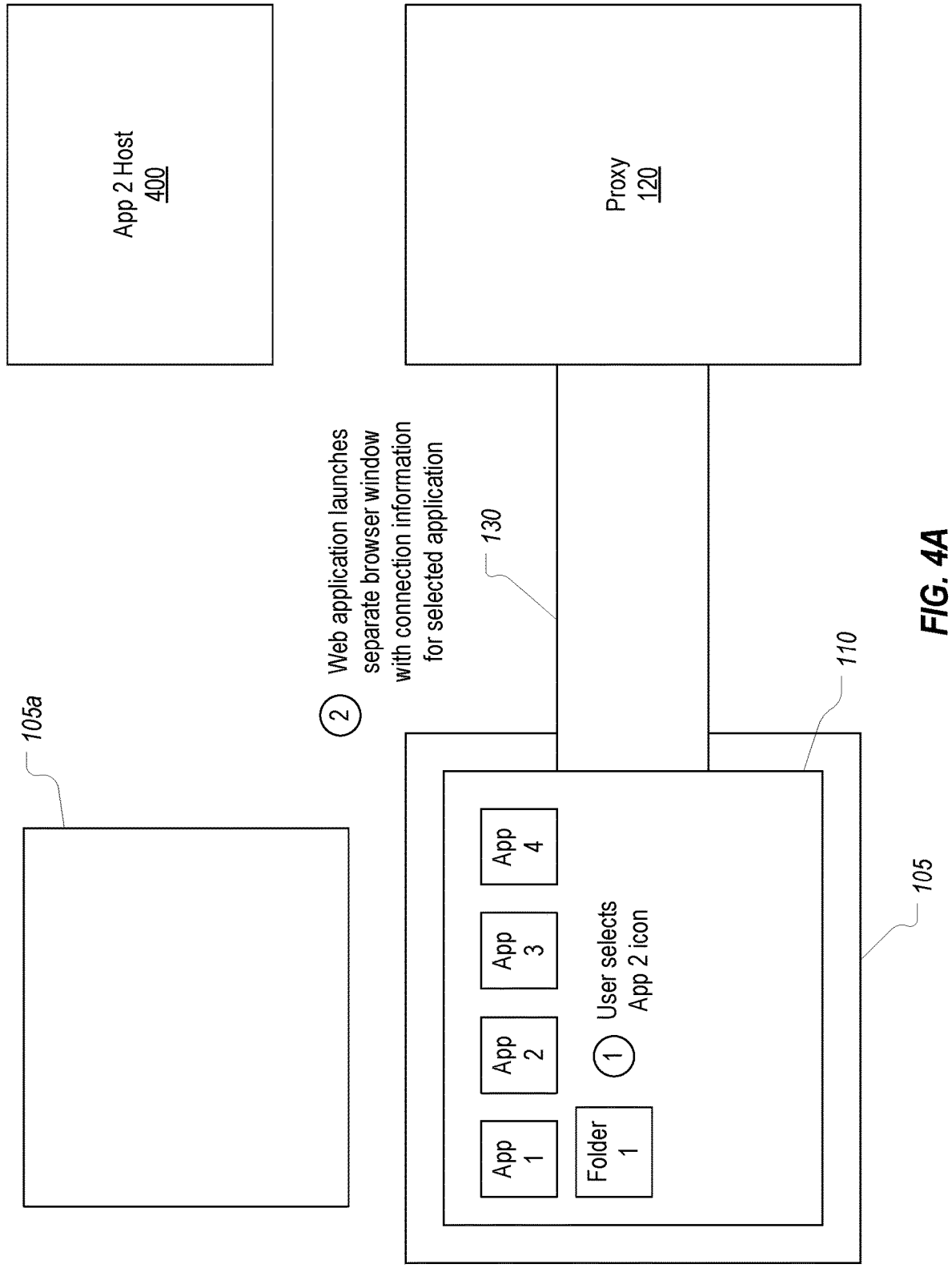

SECURE SOFTWARE CLIENT

CROSS-REFERENCE TO RELATED APPLICATIONS

N/A

BACKGROUND

A web application is an application that runs in a browser. A web application may be configured to run in a standard browser (e.g., Internet Explorer, Chrome, Safari, etc.) or as a self-contained web application. Because it runs in the browser, a web application can be executed on any platform that supports a browser. Although various programming languages can be employed to design web applications, JavaScript is commonly used in conjunction with HTML5 which provides a number of APIs that can be accessed from the JavaScript code. Through these APIs, a web application can access the file system of the underlying operating system, establish a socket connection with a server, implement drag and drop functionality, etc.

BRIEF SUMMARY

The present invention extends to methods, systems, and computer program products for providing a secure software client. A secure software client can be partitioned into a web application that functions as the user interface and a proxy that performs a number of functions to provide a desktop-like experience within the web application. The web application can be isolated within the browser and can communicate with the proxy via a secure web socket thereby allowing the proxy to be securely isolated from other types of access.

The proxy can generate a desktop in the form of HTML5 content that the web application can render. The proxy can customize the desktop to include representations of applications or other functionality that are available to the user. The web application can detect user interaction with the HTML5 content and respond accordingly including, in some cases, relaying the interaction to the proxy via the secure web socket. In such cases, the proxy can employ mappings to identify which application or functionality the interaction was directed towards and then take appropriate action. Because the desktop is presented as HTML5 content, it can be dynamically resized to facilitate access to the desktop on devices having many different form factors.

To further enhance security, the web application and proxy can each be run within a secure enclave. Also, to prevent the web application from being obtained from an unauthorized source, a certificate is required to load the web application in the browser.

In one embodiment, the present invention is implemented as computer storage media storing computer executable instructions which when executed on one or more processors implement a secure software client that includes a proxy that executes as a native application, and a web application that executes within a browser. The web application is configured to communicate with the proxy via a communication channel. The proxy is configured to generate user interface content for the web application and to send the user interface content to the web application over the communication channel. The user interface content includes a representation of one or more applications available to a user. The web application is configured to display the user interface content within the browser.

In another embodiment, the present invention is implemented as a method for providing a secure software client. A web application that is executed within a browser receives user interface content via a communication channel from a proxy that executes as a native application. The web application displays the user interface content and then detects user input to the displayed user interface content. The web application sends, to the proxy and via the communication channel, one or more communications that identify a location of the user input within the displayed user interface content. The proxy then identifies an application or functionality associated with the location.

In another embodiment, the present invention is implemented as a system that includes a first computing device on which a browser is executed, a proxy that is executed natively on the first computing device or on a second computing device, and a web application that is executed in the browser. The web application and the proxy are configured to communicate via a communication channel. The proxy is configured to generate user interface content to represent a desktop user interface and to send the user interface content over the communication channel to the web application for display within the browser.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which:

FIGS. 4A and 4B illustrate how the web application can cause a remote application to be launched;

DETAILED DESCRIPTION

Figure 1:
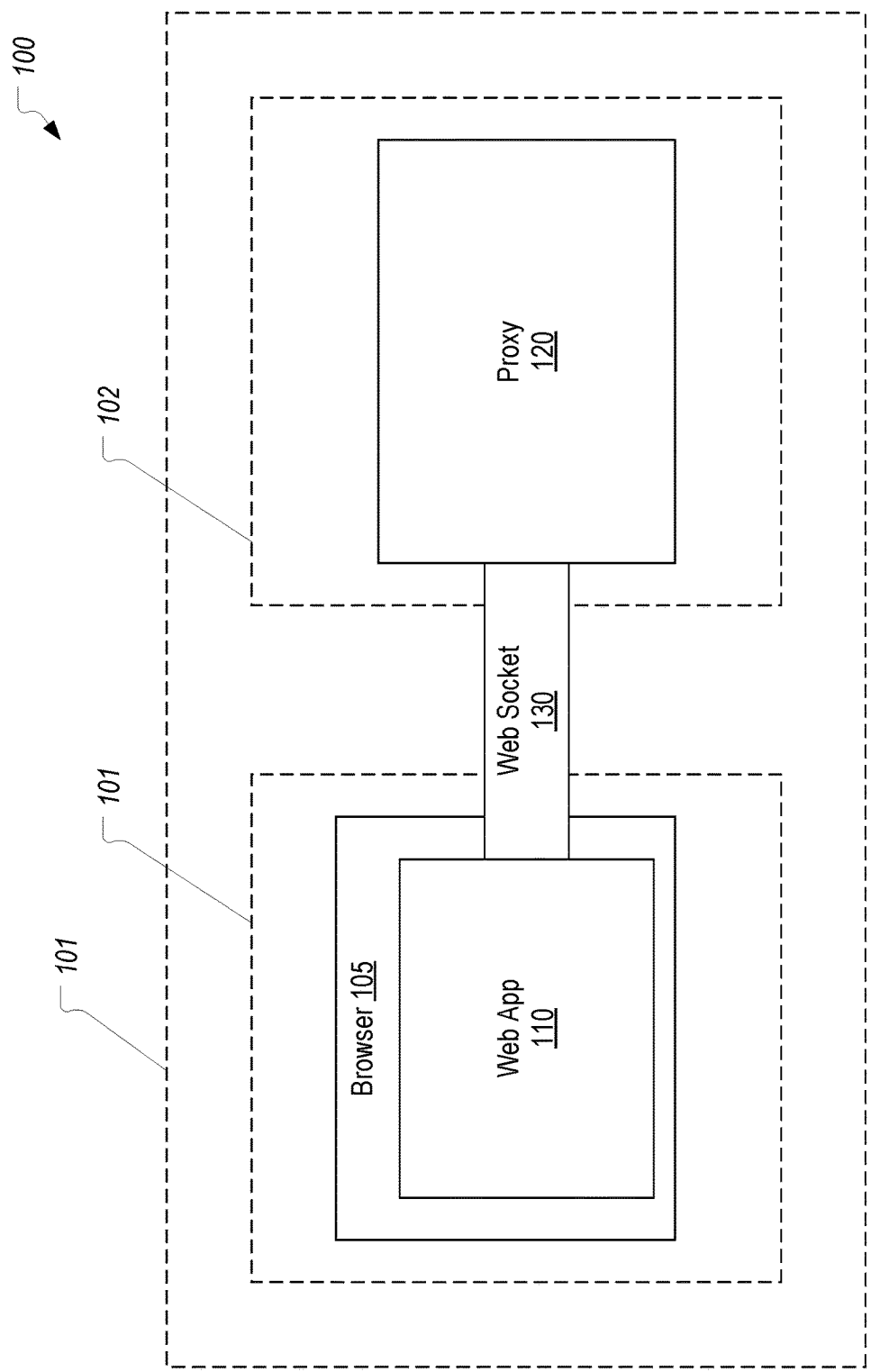
FIG. 1 illustrates an example computing environment in which the present invention can be implemented.

FIG. 1 illustrates an example computing environment 100 in which the present invention can be implemented. Computing environment 100 includes at least one computing device 101. Computing device 101 can be configured to execute a browser 105 within which a web application 110 runs. Web application 110 can be configured to establish a communication channel (e.g., web socket 130) with a proxy 120. As represented by the dotted lines, in some embodiments, proxy 120 may execute on the same computing device 101 as web application 110, while in other embodiments, proxy 120 may execute on a separate computing device (e.g., a server 102). In many cases, computing device 101 may be a thin client.

Figure 2:
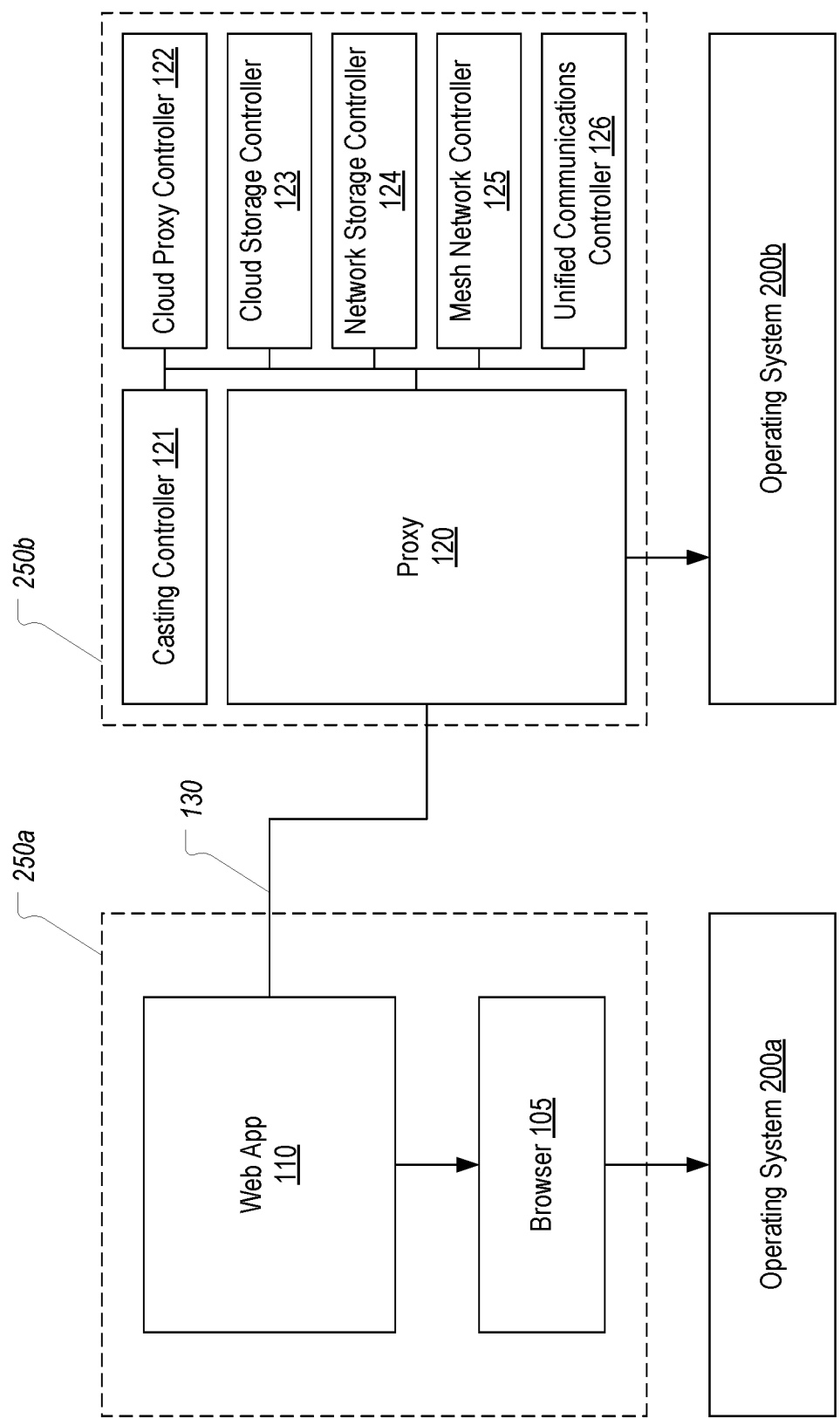
FIG. 2 illustrates an example architecture of a secure software client.

FIG. 2 provides a more detailed example of the architecture of a secure software client in accordance with some embodiments of the present invention. As shown, web application 110 is executed within browser 105 by an operating system 200a. In some embodiments, the runtimes of web application 110 and browser 105 can be secured within an enclave 250a (e.g., an Intel SGX enclave) to prevent access to web application 110 from any components outside enclave 250a.

Similarly, proxy 120, which may include a number of controllers 121-126, may also be secured within an enclave 250b. Based on an assumption that proxy 120 is hosted on server 102, FIG. 2 depicts proxy 120 being executed by operating system 200b. However, in cases where proxy 120 is hosted on computing device 101, proxy 120 would be executed by operating system 200a. Controllers 121-126 comprise optional components of proxy 120 which can provide extended functionality to web application 110 as will be further described below.

Figure 3A:
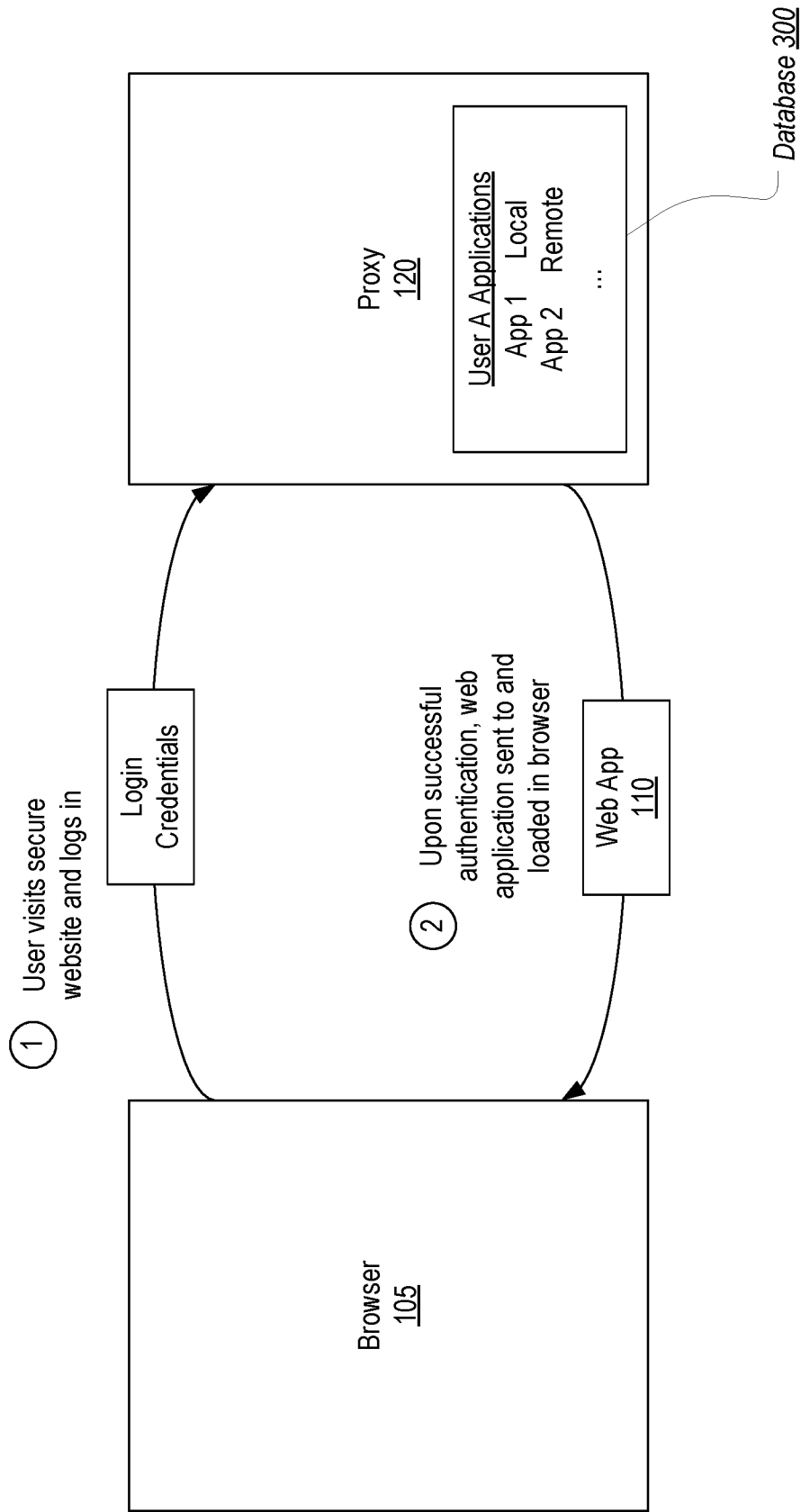
FIGS. 3A and 3B illustrate an example sequence of steps by which a web application and a proxy can communicate to provide a desktop-like experience within a browser.
Figure 3B:
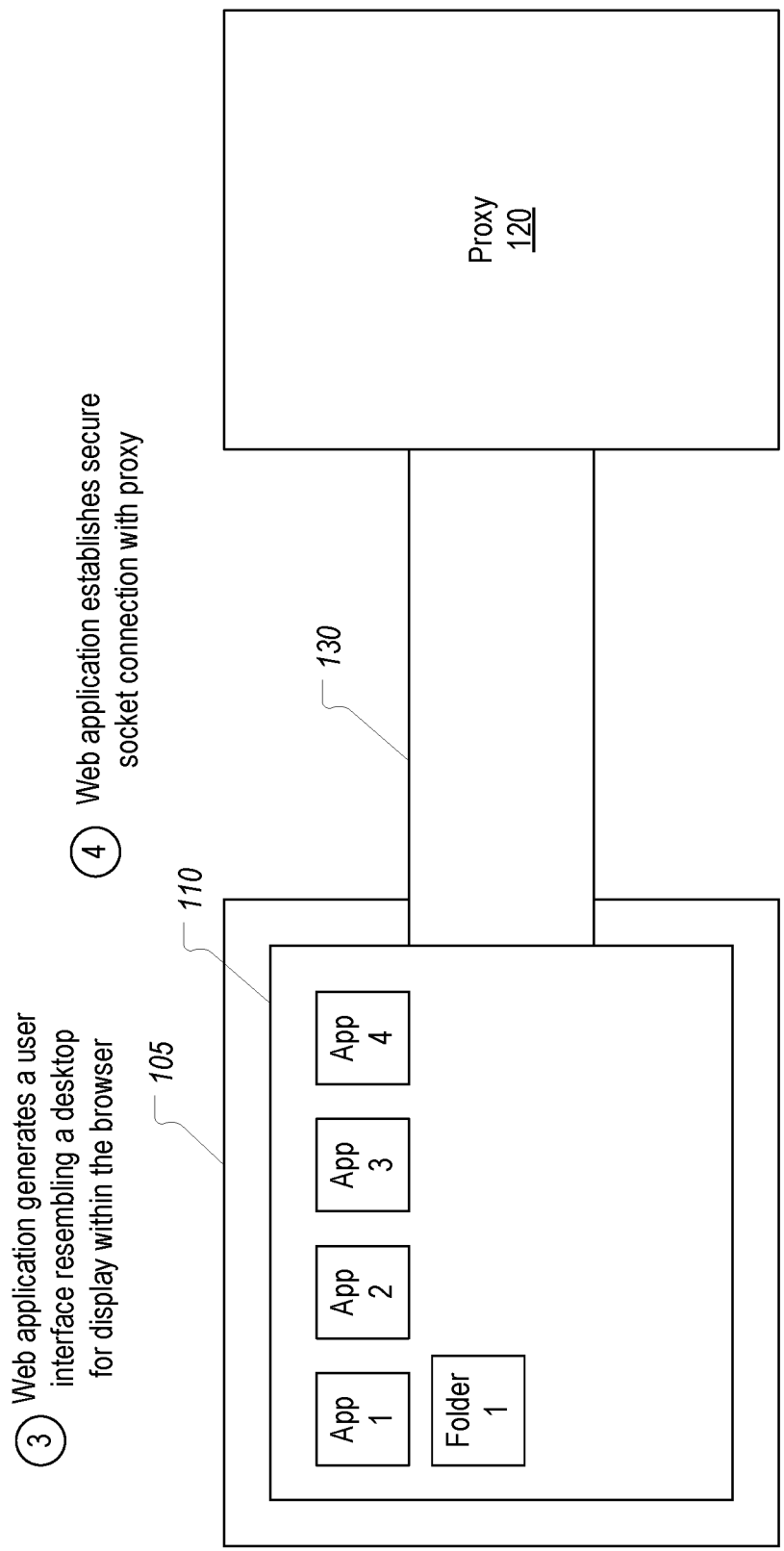

FIGS. 3A and 3B illustrate an example of how web application 110 and proxy 120 can interoperate to provide a desktop experience within browser 105. In step 1 shown in FIG. 3A, the user can employ browser 105 to visit a website that functions as a portal to web application 110 and authenticate. As a result, login credentials will be sent to proxy 120 (or to a server associated with proxy 120 which may load proxy 120 in response to successful authentication). In any case, assuming the user successfully authenticates, web application 110 can be provided to browser 105 in step 2. In some embodiments, web application 110 can be prevented from loading in browser 105 unless a valid certificate is presented. This can ensure that web application 110 can only be retrieved from a trusted source. Although not shown, as part of step 2, proxy 120 (or the associated server) can create a desktop user interface for the user. This desktop user interface can be defined in the HTML5 format (or other suitable HTML standard) so that, when displayed in browser 105, the desktop user interface will resemble a desktop of a typical operating system.

For example, the desktop user interface can be rendered to include a number of icons representing the various applications that the user is allowed to access and possibly folders or files similar to a Windows desktop. Which applications (or icons representing applications) are included in the user's desktop user interface can be determined using a number of different configuration settings including, for example, by configuring the desktop based on Active Directory group policy objects or some other administrator-managed settings. For sake of illustration, in FIG. 3A, proxy 120 is shown as including (or having access to) a database 300 which defines which applications should be included in User A's desktop user interface as well as where each of these applications is located. For simplicity, App 1 is identified as being local while App 2 is identified as being remote. However, in actual implementations, the identification of the location of the application may specify a path or URL that can be employed to launch the application (or launch a session for accessing the application such as in the case when the application is accessed via a VDI infrastructure). Examples of these different configurations will be provided below. Of primary importance is the fact that proxy 120 maintains (or has access to) information to allow it to configure web application 110 appropriately based on which applications and/or content are made available to the user and where these applications and/or content are located.

Although not shown in FIG. 3A, database 300 can also identify any storage providers/locations that should be made available to the user within the desktop user interface. For example, if the user has access to a shared drive and a cloud storage provider, such information can be defined in database 300 to allow proxy 120 to generate an icon (e.g., a folder icon) for inclusion in the desktop user interface. The manner in which proxy 120 can create a unified view of a user's content that may be spread across various providers/locations will be described below.

Turning now to FIG. 3B, once web application 110 is loaded in browser 105, it can render the HTML5 content defining its user interface in step 3. In this example, it will be assumed that the user interface includes icons representing four different applications (App 1 through App 4) that are available to the user along with a folder representing a unified view of the user's content. As mentioned above, this user interface can be configured to appear substantially similar to any of the various common desktop user interfaces (e.g., a Windows desktop). In this way, even though the desktop user interface is contained in a browser, from the user perspective, it will still appear and function similar to a typical desktop. For the sake of illustration, it will be assumed that the App 1 icon is defined in the HTML5 code to be displayed in zone 1, the App 2 icon is defined to be displayed in zone 2, and so on. In addition to displaying the desktop user interface, web application 110 can also establish a secure web socket connection with proxy 120 (or employ a RESTful API or other suitable communication mechanism) that can be used to communicate user input events and display data as represented by step 4 in FIG. 3B.

With the desktop user interface displayed, the user may then commence interacting with the desktop such as by clicking on any of the displayed icons. The manner in which web application 110 responds to the user's selection of a particular icon will depend on what the selected icon represents. For example, if a selected icon represents an application that is located remotely, the HTML5 content defining the icon can also include an identification of the location (e.g., a URL) where the application can be accessed. On the other hand, if proxy 120 is executed on the same computing device 101 as web application 110 and a selected icon represents an application that is local, web application 110 can send a communication to proxy 120 (e.g., via the web socket connection) that identifies the selection of the icon, and proxy 120 can respond by launching the application (which will in turn run in a normal fashion on computing device 101). If the selected icon is a folder, web application 110 can similarly notify proxy 120 of the selection, and proxy 120 can generate HTML5 content to represent the user's content. Each of these different processes will now be described in detail.

Figure 4B:
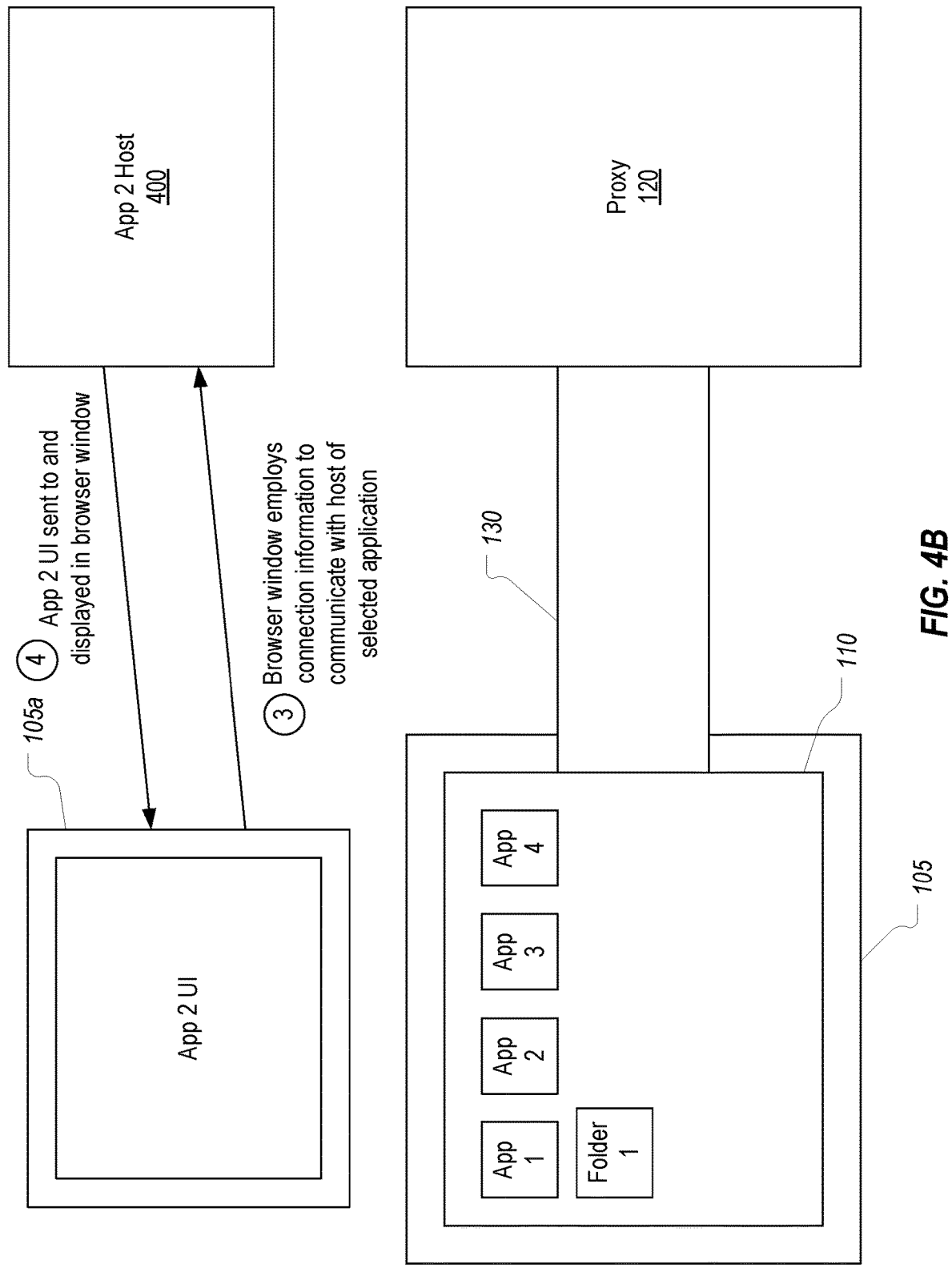

FIGS. 4A and 4B illustrate the processing that is performed when the user selects an application that is hosted remotely. In this context, a remotely hosted application should be construed as including cloud-based applications and applications that are accessed via a VDI architecture. In step 1, shown in FIG. 4A, it is assumed that the user selects the App 2 icon from within the desktop user interface that is displayed within browser 105. As mentioned above, because App 2 is hosted remotely, proxy 120 would have configured the HMTL5 content of web application 110 to define "connection information" for App 2 in association with the App 2 icon. As an example, the App 2 icon could include a URL where App 2 can be accessed and may also possibly include any credentials necessary for launching App 2.

In response to the selection of the App 2 icon, web application 110 can launch a separate browser window 105a using the connection information defined for the App 2 icon. This will cause browser window 105a to communicate with the App 2 host 400 as represented in step 3 of FIG. 4B. If App 2 is a cloud-based application, App 2 host would typically represent a cloud service, whereas if App 2 is a VDI application, App 2 host 400 would typically represent a connection broker. As one of skill in the art would understand how such applications would be accessed from a browser, no further discussion will be provided. Finally, based on the interaction between browser window 105a and App 2 host 400, the user interface for App 2 (which may be in the form of HTML5 content) can be provided to browser window 105a for display to the user.

To summarize, when an application accessible to the user is located remotely, proxy 120 can configure the corresponding icon to include connection information that web application 110 can employ to launch a separate browser window for accessing the application. The separate browser window accesses the application independently of proxy 120. In this way, the remote applications can only be accessed from computing device 101 via web application 110 thereby enhancing security.

Figure 5A:
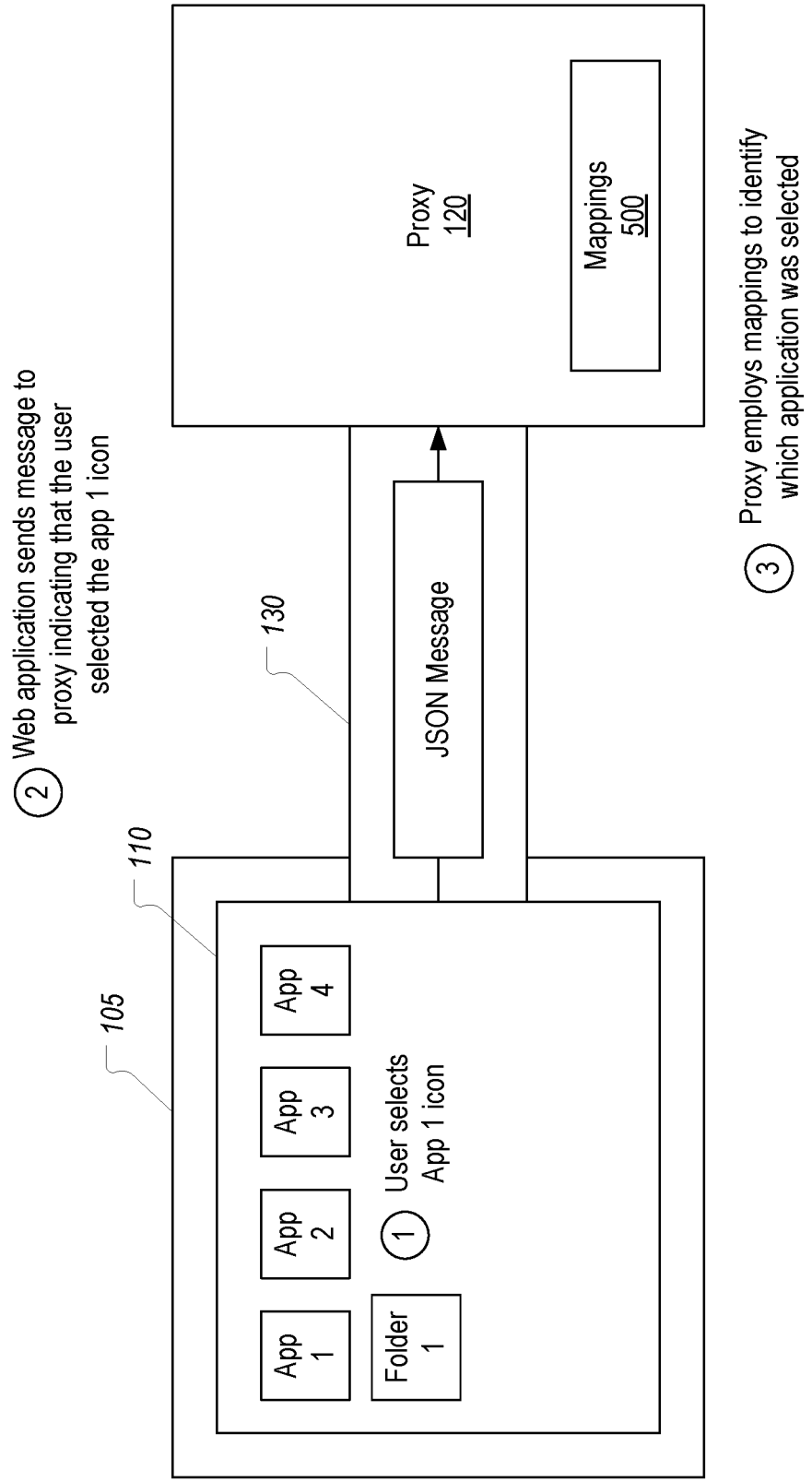
FIGS. 5A and 5B illustrate how the web application can cause the proxy to launch a local application.
Figure 5B:
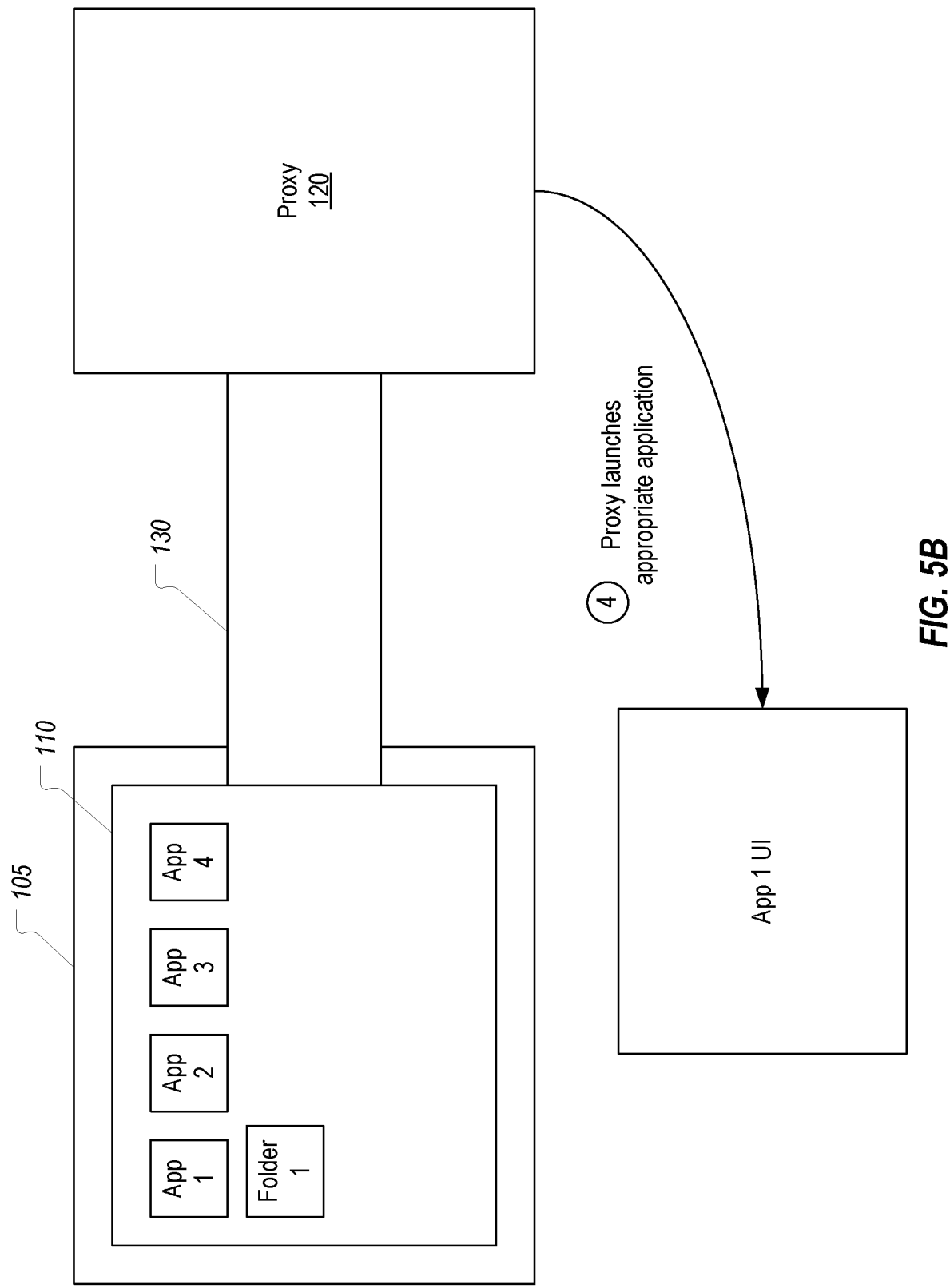

FIGS. 5A and 5B illustrate an example where the selected application is local. In this case, it will be assumed that proxy 120 is also local to computing device 101 (i.e., proxy 120 and web application 110 are executing on the same computing device). In step 1, shown in FIG. 5A, it is assumed that the user has selected the App 1 icon. When creating the HTML5 content for web application 110, proxy 120 would have configured the App 1 icon to indicate that App 1 is a local application. Also, proxy 120 can be configured to define mappings 500 between zones of the desktop image and local applications whose icons are displayed in the zones. For example, proxy 120 can define a mapping between a top, left corner of the desktop image and App 1.

In response to the selection of the App 1 icon, web application 110 can determine that a message should be sent to proxy 120 informing proxy 120 that the selected local application should be launched. For example, as represented in step 2, web application 110 can generate a JSON message (or other suitably formatted message) which identifies the location of the App 1 icon within the desktop user interface and send the message to proxy 120. In this example, web application 110 could identify the top, left corner as the location of the selected icon.

In step 3, proxy 120 can process the received message to determine that an icon was selected at the specified location of the desktop user interface and employ mappings 500 to determine which application was selected. It is noted that this same process would be employed if the selected icon represented a folder or some other functionality that is provided directly by proxy 120 even in cases where proxy 120 is not local to computing device 101.

Finally, in step 4, shown in FIG. 5B, proxy 120 will launch the application represented by the selected icon (which is possible because proxy 120 executes natively). In this case, proxy 120 will launch App 1 on computing device 101. App 1 will then execute locally in a typical fashion (i.e., not within the browser). As an example, App 1 can represent a calculator application, a PDF or XPS viewer, or other type of application that may typically be provided as a local application on a thin client.

Figure 6A:
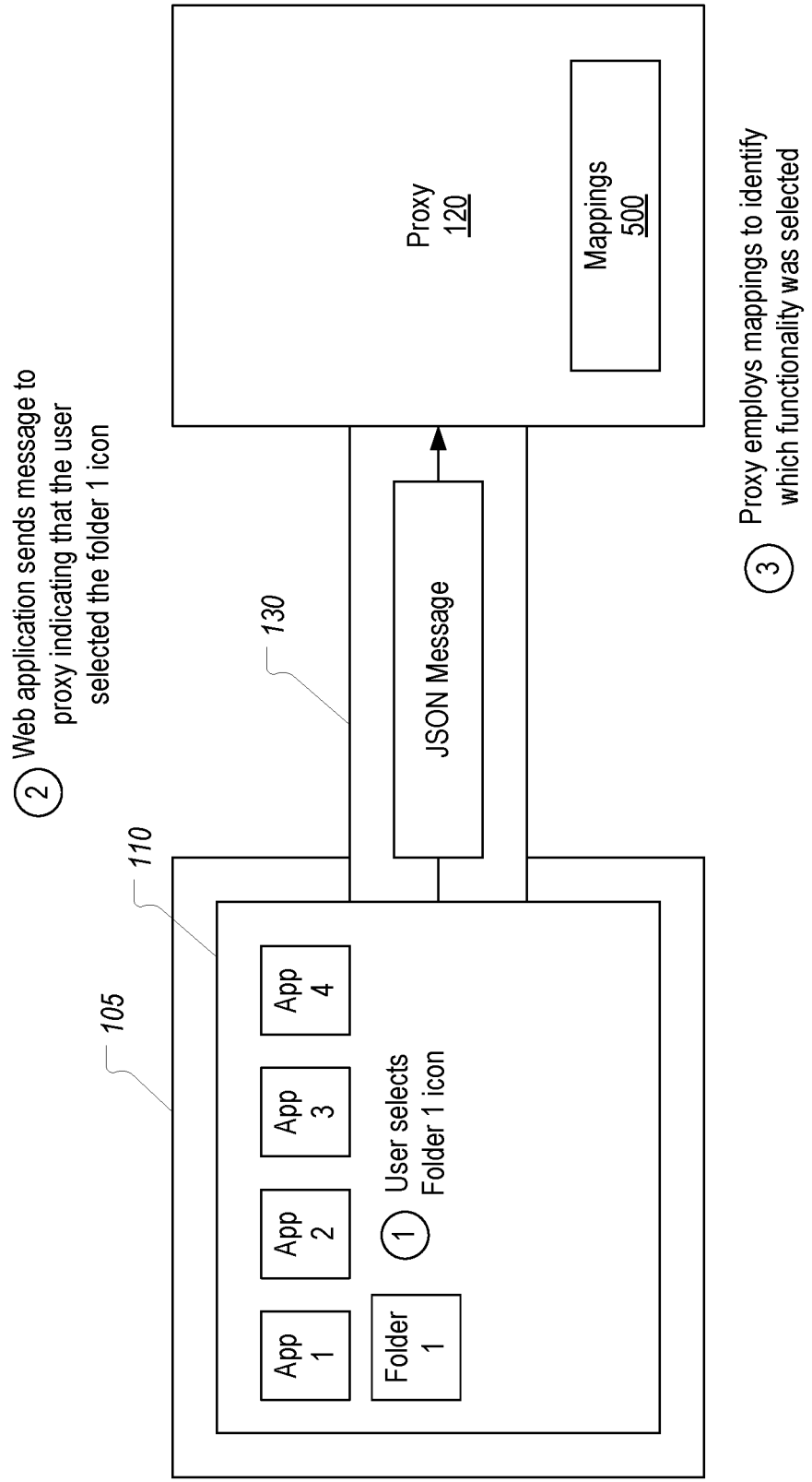
FIGS. 6A-6C illustrate how the proxy can generate a user interface representing a file explorer.
Figure 6B:
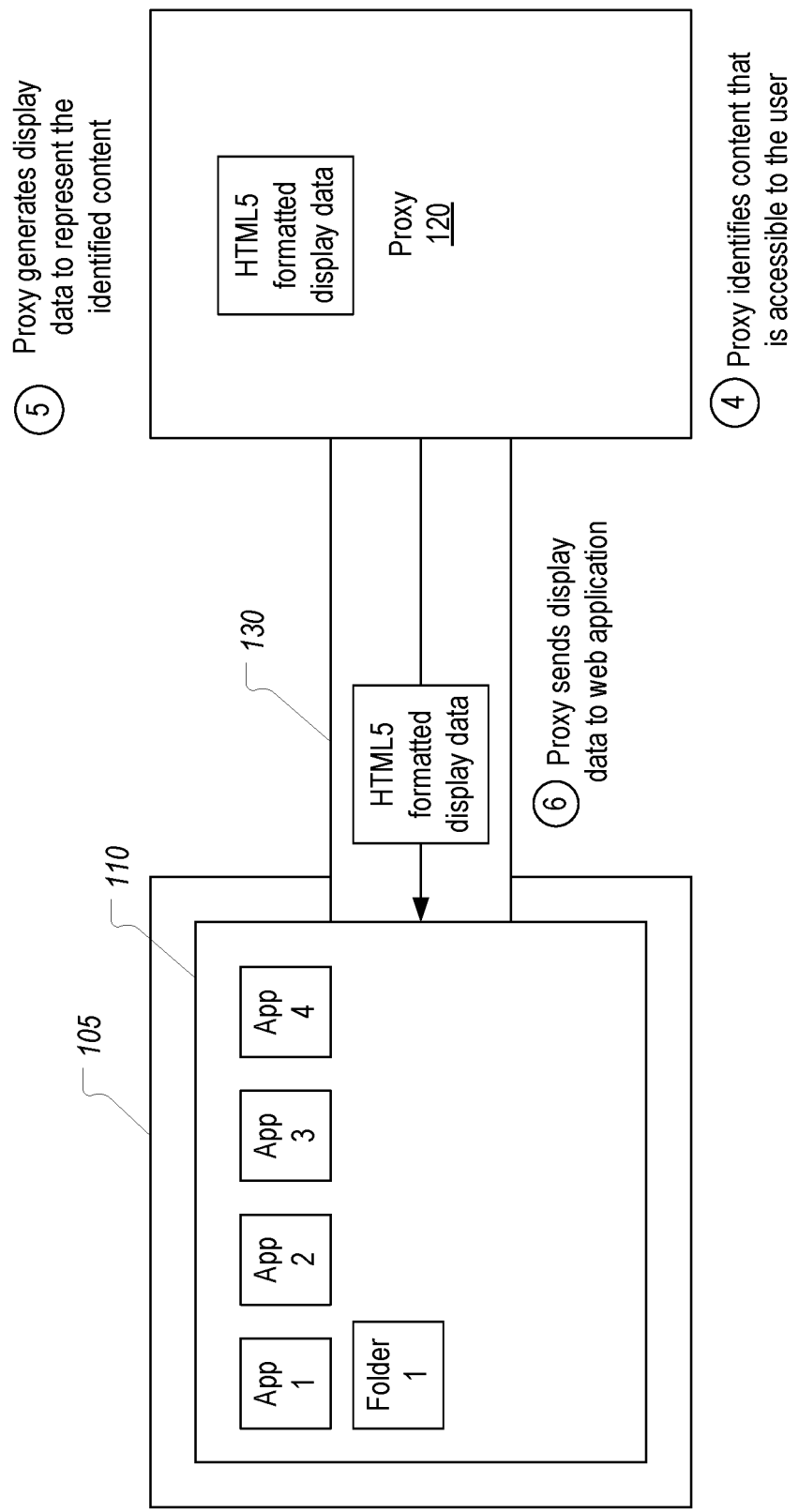
Figure 6C:
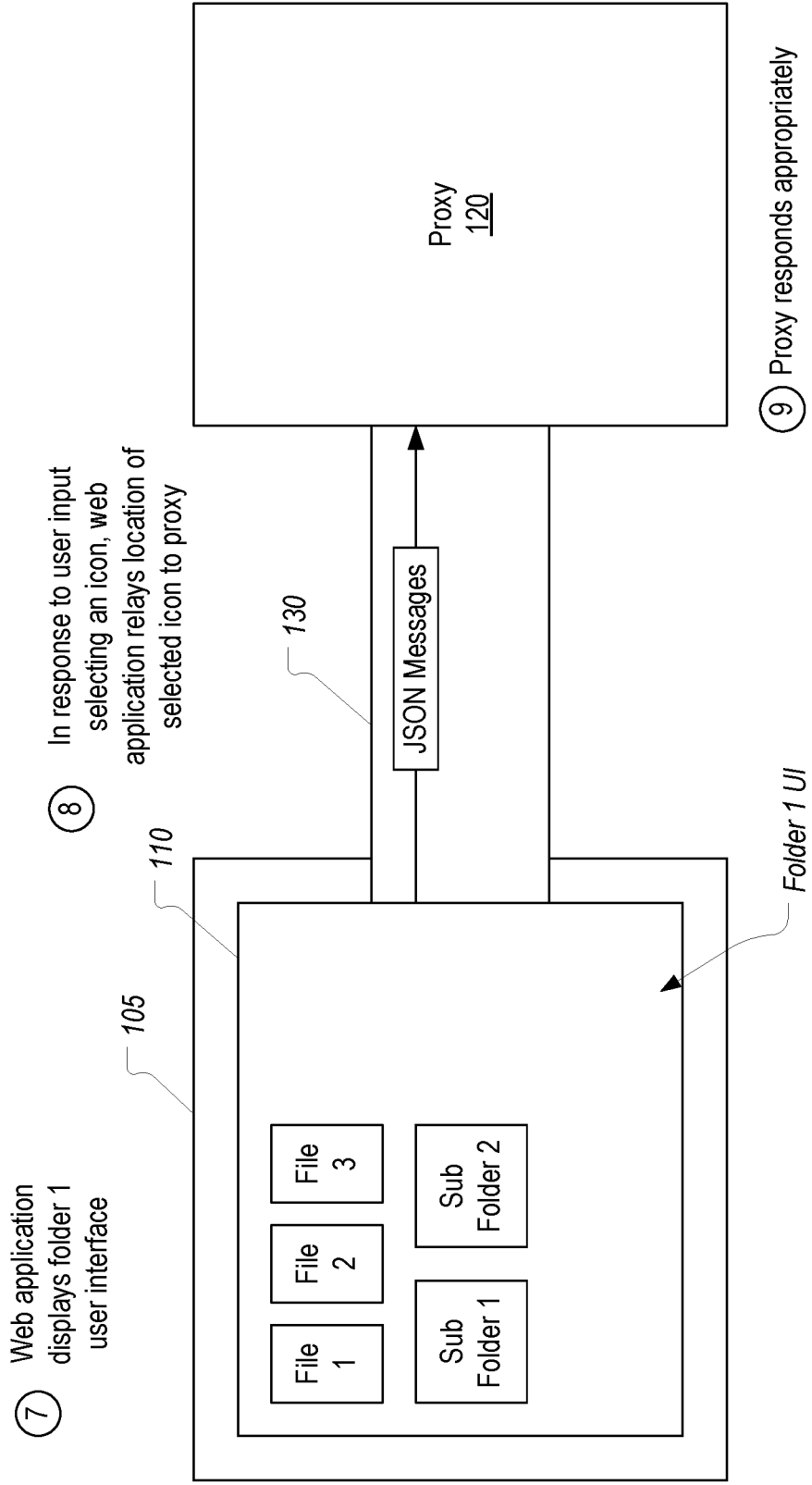

FIGS. 6A-6C illustrate an example of how proxy 120 can generate a view of the user's content within the desktop user interface. In step 1, shown in FIG. 6A, it is assumed that the user selects the Folder 1 icon. In response, steps 2 and 3 will be performed in substantially the same manner as described above with reference to FIG. 5A. In particular, web application 110 can send a message identifying the location of the selected icon in step 2 and proxy 120 can employ the location and mappings 500 to determine what "functionality" was selected. Accordingly, mappings 500 can link locations to applications as well as locations to other types of functionality. In this case, Folder 1 can be equated with the Windows File Explorer (or other similar file manager) or to an individual folder.

Turning now to FIG. 6B, once proxy 120 has determined that the user has selected the Folder 1 icon, in step 4, proxy 120 can identify the content that is accessible to the user. For example, proxy 120 can maintain a listing of storage providers/locations that are accessible to the user similar to how the applications available to the user are defined. For simplicity, it will be assumed in this example that the user has access to a folder on a shared drive. However, in cases where proxy 120 is local, it is equally possible that the user may have access to local folders and/or shared drives. Also, as will be further described below, in some embodiments, proxy 120 may generate a unified view of multiple storage locations/providers.

Based on the assumption that the user has access to a folder on a shared drive (and therefore, that the Folder 1 icon represents this folder), proxy 120 can identify the contents of the folder on the shared drive and generate display data for the contents in step 5. For example, if the folder includes three files and two sub folders, proxy 120 can generate HTML5 content that includes icons for each of the files and the sub folders. Although not shown, proxy 120 can generate mappings between the locations of the various icons and the folders/files they represent. In step 6, proxy 120 can send this generated display data to web application 110.

In step 7, web application 110 can render the display data to display the Folder 1 user interface. In this example, it will be assumed that web application 110 displays the Folder 1 user interface within the same browser window in which the desktop user interface was displayed. However, it is equally possible that web application 110 may launch a separate browser window to display the Folder 1 user interface. In such a case, the separate browser window can employ web socket 130 or create a separate connection back to proxy 120.

It is important to note that proxy 120 itself creates the Folder 1 user interface (i.e., the Folder 1 user interface is not generated by another application or system) based on the contents of the folder(s) that are made available to the user. Therefore, as the user interacts with the Folder 1 user interface, it will be necessary for web application 110 and proxy 120 to communicate in order to update the Folder 1 user interface appropriately. For example, as represented in step 8, if the user selects one of the icons displayed in the Folder 1 user interface, a message identifying the location of the user input can be sent to proxy 120 in much the same manner as the location of user input was reported in step 2. Proxy 120 can then employ the relevant mappings to determine what folder or file the user has selected and respond appropriately as generally represented by step 9.

In the case where the user has selected a sub folder, proxy 120 can respond by repeating steps 4, 5 and 6 to cause the user interface to be updated appropriately (e.g., to display the contents of sub folder 1 rather than the contents of folder 1). In contrast, if the user selects a file icon, the appropriate application can be launched to open the selected file. How the application is launched will depend on where the application is located. For example, if File 1 is a Word document and Word is a cloud-based or VDI application, proxy 120 could have configured the HTML5 content so that the File 1 icon included the URL for opening File 1 in Word (i.e., similar to the process shown in FIGS. 4A and 4B). In contrast, if File 2 is an XPS document and an XPS viewer is located on computing device 101, a process similar to that shown in FIGS. 5A and 5B can be employed to open File 2 in the local XPS viewer. In either case, proxy 120 can configure the Folder 1 user interface so that web application 110 can respond appropriately when a file icon is selected.

By employing web application 110 to display the desktop user interface and proxy 120 to perform the functionality for interfacing with the underlying operating system, a secure environment is created. In particular, the user's interactions all occur within the sandboxed browser environment with limited messages being relayed between web application 110 and proxy 120. Also, the actual data (e.g., files) are never present on computing device 101 (unless of course the files are stored locally). Therefore, if malicious code happened to infect computing device 101, there would be little if any access to the user's applications and content. This would be the case even when proxy 120 executes locally on computing device 101 (since web socket 130 would still be the only means provided for communicating between web application 110 and proxy 120). By securing web application 110 and proxy 120 in enclaves, further protection is provided since it would prevent their runtimes from being accessed by an external component.

As depicted in FIG. 2, proxy 120 can include a number of controllers 121-126 which can extend the functionality of proxy 120. These can include a casting controller 121, a cloud proxy controller 122, a cloud storage controller 123, a network storage controller 124, a mesh network controller 125, and a unified communications controller 126. In essence, by employing controllers 121-126, proxy 120 can cause web application 110 to further resemble a traditional desktop.

Proxy 120 can employ casting controller 121 to enable the user interface of web application 110 to be cast or extended to another display. For example, casting controller 121 can be configured to implement the necessary protocols for casting to a Chromecast, Miracast, or other similar cast device. Proxy 120 can then pass to casting controller 121 the same HTML5 content that is provides to web application 110. Casting controller 121 can then implement the appropriate casting protocol to cause web application 110's user interface to be displayed on another display device. Casting controller 121 may be most suitable when proxy 120 is executed on the same computing device 101 as web application 110 (i.e., in embodiments where computing device 101 and the display device are connected to the same LAN).

In some embodiments, casting controller 121 can be employed to cast web application 110's UI to another web application to thereby allow multiple users to collaborate and provide simultaneous input to the same user interface. In such a case, input to the user interface can be relayed to proxy 120 in the same manner as described above regardless of which web application instance receives the input.

Proxy 120 can employ cloud proxy controller 122 to interface with any of the various cloud platforms such as Windows Azure, Amazon Web Services, Google CloudPlatform, or vCloud Air. This interfacing may be necessary to determine how the desktop user interface should be configured to enable web application 110 to access a cloud-based application.

Proxy 120 can employ cloud storage controller 123 to interface with the various cloud storage providers (e.g., OneDrive, Google Drive, Dropbox, etc.) to allow files stored in the cloud to be accessed from web application 110. Similarly, proxy 120 can employ network storage controller 124 to interface with various network storage solutions (e.g., SAN and NAS). In some embodiments, proxy 120 can be configured to provide a unified view of a user's content that may be spread across cloud storage, network storage, and/or local storage. For example, and with reference to FIG. 6B, if the user has access to content spread across a number of locations/providers, proxy 120 could configure the Folder 1 user interface to include all of the user's content (e.g., similar to the Windows File Explorer). In such a case, sub folder 1 could represent one cloud storage provider and sub folder 2 could represent another cloud storage provider, a network drive or folder, or a local folder.

Figure 7A:
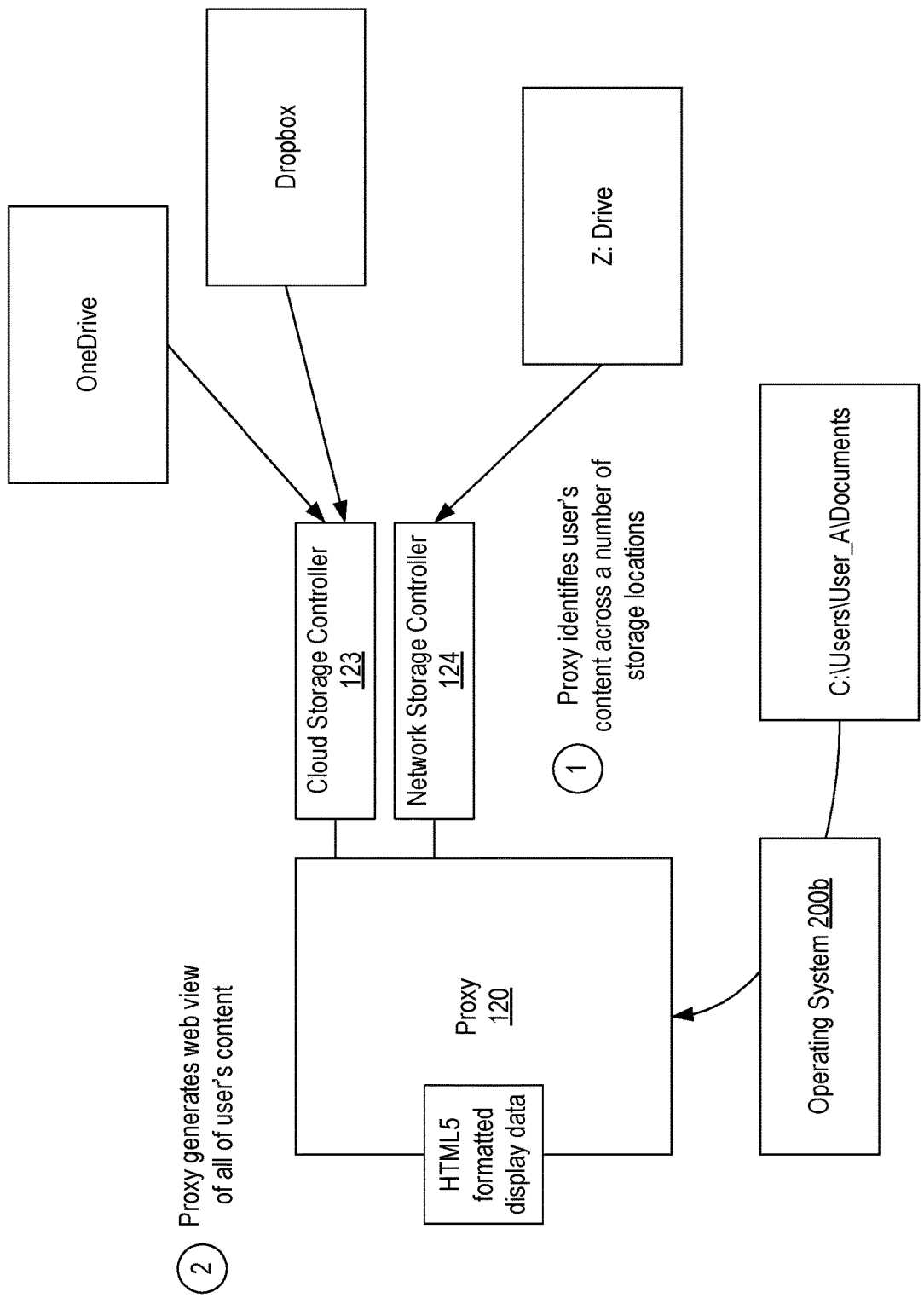
FIGS. 7A and 7B illustrate an example of how the proxy can generate and provide a web view of the user's content.
Figure 7B:
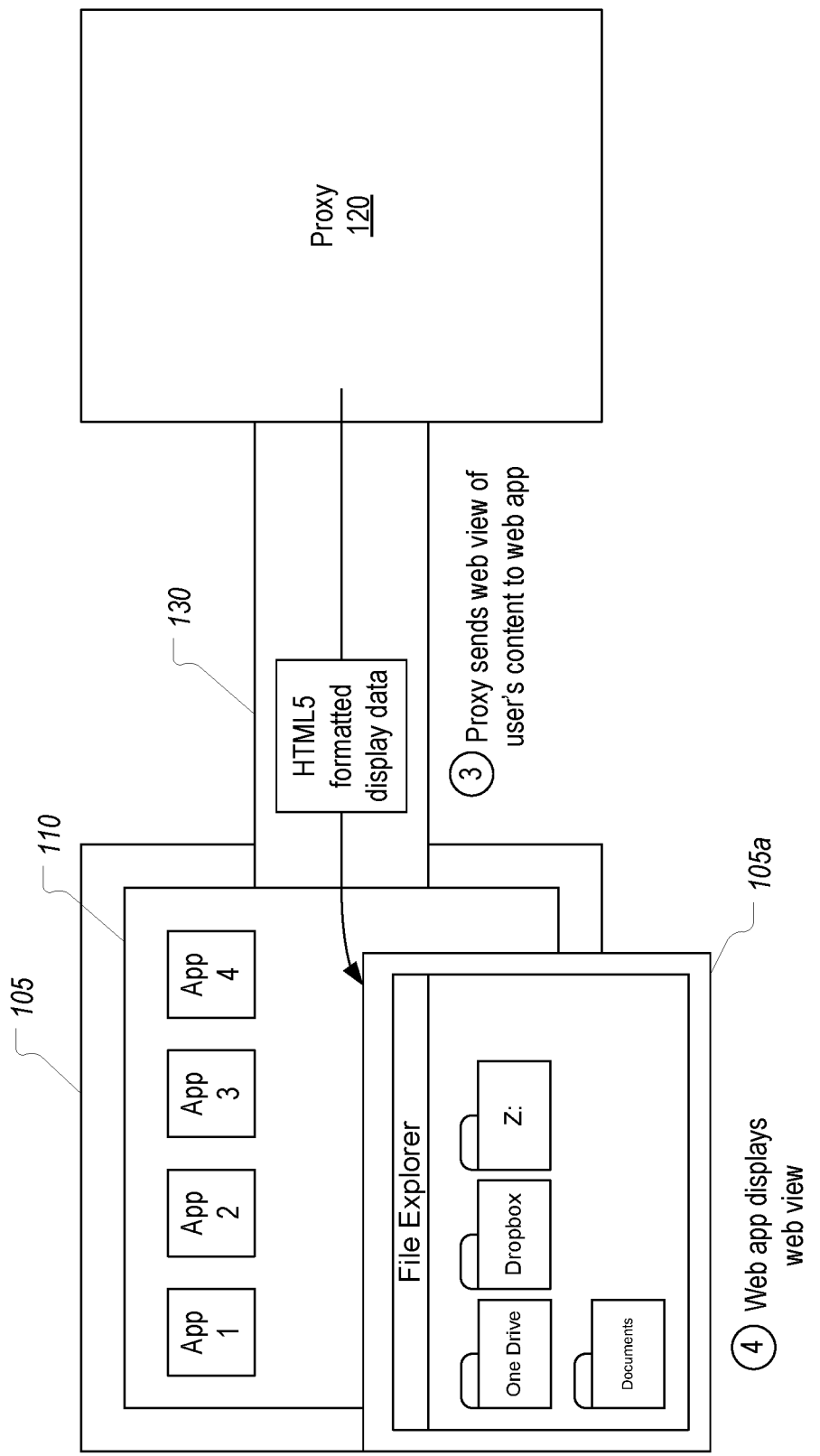

FIGS. 7A and 7B provide an example of how proxy 120 can provide this type of web view or unified view of the user's content that is spread across a number of providers/locations. In FIG. 7A, it will be assumed that the user has a OneDrive account and a Dropbox account, that the user has mapped a network drive as the Z: drive, and that the user has a Documents folder on the local file system. In step 1, proxy 120 can use appropriate techniques to identify content that is available at each storage location/provider. In the case of OneDrive and Dropbox, proxy 120 can employ cloud storage controller 123 for this purpose, while in the case of the network drive, proxy 120 can employ network storage controller 124. Proxy 120 can also employ operating system 200*b* to identify any of the user's local content. Based on a determination of where the user has content stored, proxy 120 can construct a web view of the user's content in a format that resembles a typical file explorer in step 2. For example, proxy 120 could construct a web view (e.g., in HTML5 format) that includes a folder icon for each storage location.

Turning to FIG. 7B, in step 3, proxy 120 can send the HTML5 formatted web view to web application 110. Then, in step 4, web application 110 can display the web view. In FIG. 7B, it is assumed that web application 110 causes a separate browser window to be launched to display the web view. As shown, this web view could include four folders, one for each of the One Drive content, the Dropbox content, the Z: drive content, and the local Documents content. If the user selects one of these folders, web application 110 can report the user input in the manner described above with reference to FIG. 6C which will cause proxy 120 to generate and send updated display data. For example, if the user selects the One Drive folder, proxy 120 could generate HTML5 content that includes a representation for each file or folder that is stored in the root directory on One Drive.

Returning to FIG. 2, proxy 120 can employ mesh network controller 125 to dynamically create peer-to-peer VPN sessions. Also, proxy 120 can employ unified communications controller 126 to interface with the various UC providers such as Skype, Google Hangouts, etc. In the same manner as described above, proxy 120 can include representations of any functionality the user may need to interface with these functions and can handle user input appropriately.

In summary, the present invention provides a secure software client in which a web application functions as a user interface while a natively executed proxy handles the underlying processing to produce a desktop-like experience within the browser. Because of the simplicity of the web application, the present invention may be particularly suitable for use in thin client environments, but can equally be implemented in any environment including within a single computing device.

Figure 8:
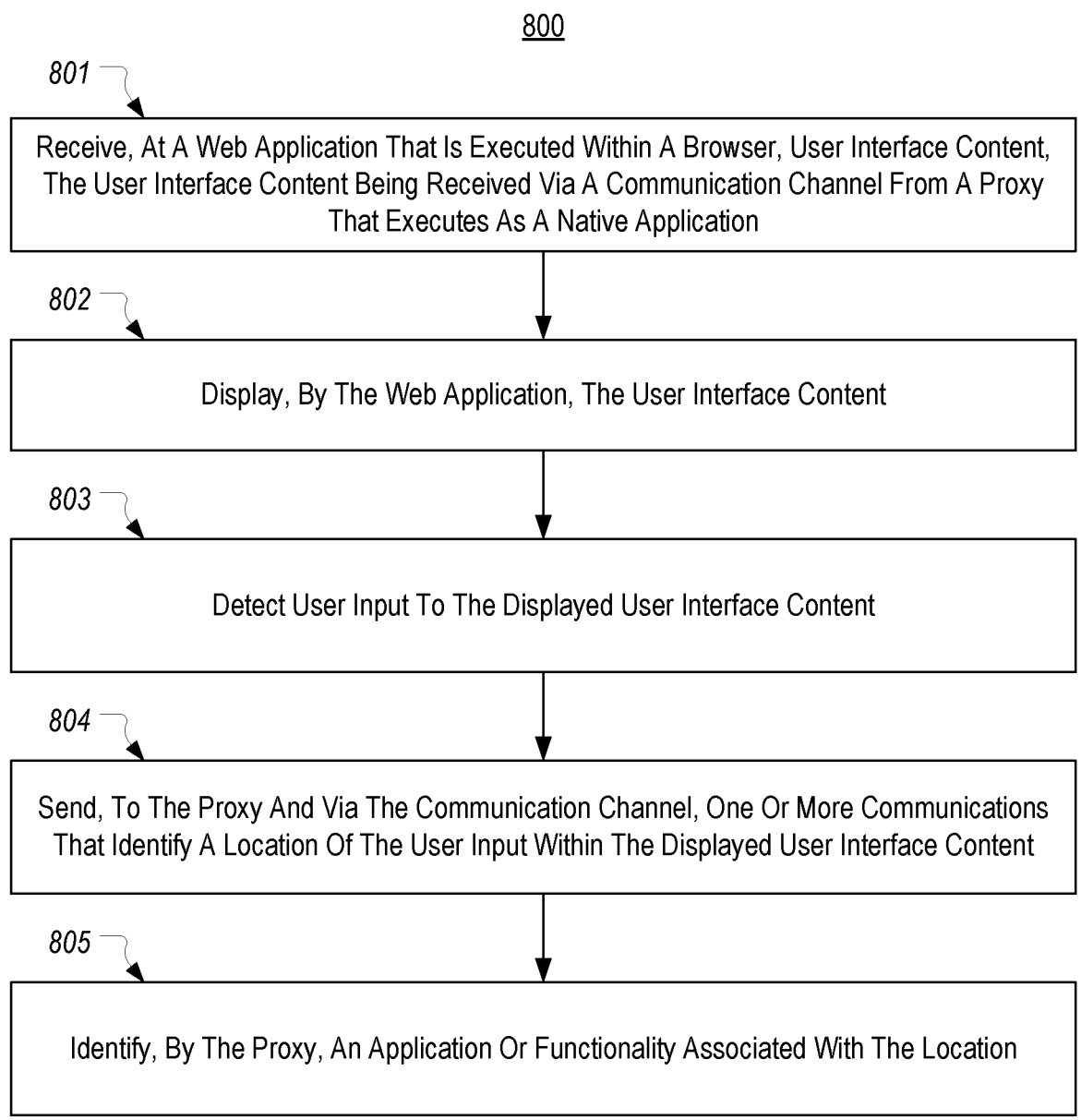
FIG. 8 provides a flowchart of an example method for providing a secure software client.

FIG. 8 provides a flowchart of an example method 800 for providing a secure software client. Method 800 can be performed by web application 110 and proxy 120 which may be executing on the same computing device or different computing devices.

Method 800 includes an act 801 of receiving, at a web application that is executed within a browser, user interface content, the user interface content being received via a communication channel from a proxy that executes as a native application. For example, web application 110 can receive HTML5 content representing a desktop user interface that was generated by proxy 120.

Method 800 includes an act 802 of displaying, by the web application, the user interface content. For example, web application 110 can cause the HTML5 content to be rendered within a browser window.

Method 800 includes an act 803 of detecting user input to the displayed user interface content. For example, web application 110 can detect a location of user input within a browser window in which the HTML5 content is displayed.

Method 800 includes an act 804 of sending, to the proxy and via the communication channel, one or more communications that identify a location of the user input within the displayed user interface content. For example, web application 110 can send one or more JSON communications to proxy 120 via web socket 130.

Method 800 includes an act 805 of identifying, by the proxy, an application or functionality associated with the location. For example, proxy 120 can determine that the location of the user input corresponds with the location to which an icon representing a particularly application or functionality is mapped.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media is categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves.

Computer-executable instructions comprise, for example, instructions and data which, when executed by a processor, cause a general purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. One or more non-transitory computer storage media storing computer executable instructions which when executed on one or more processors implement a secure software client comprising:
    a proxy that executes as a native application on a computing device of the user; and
    a web application that executes within a browser on the computing device of the user, the web application being configured to communicate with the proxy, via a communication channel, to receive user interface content that the web application employs to generate and display a desktop within the browser on the computing device, wherein the user interface content is HTML5 content;
    wherein the proxy is configured to generate and send the user interface content that the web application employs to generate and display the desktop by:
        identifying multiple applications that the user of the computing device is allowed to access, the multiple applications including at least one remotely hosted application and at least one local application that is hosted on the computing device;
        defining, for each of the multiple applications, a corresponding representation of the application within the user interface content, wherein the representation for each of the at least one remotely hosted application includes connection information for the remotely hosted application; and
        sending the user interface content to the web application to thereby cause the web application to generate and display the desktop within the browser, the desktop including the representations of the multiple applications to thereby enable the user to select any of the representations that are displayed in the desktop to invoke the corresponding application;
    wherein, in response to the representation of any of the at least one remotely hosted application being selected in the desktop displayed within the browser, the web application launches a separate browser window which uses the connection information included in the selected representation to display a user interface of the respective remotely hosted application within the separate browser window;

wherein, in response to the representation of any of the at least one local application being selected in the desktop displayed within the browser, the web application sends a communication to the proxy via the communication channel indicating that the representation of the local application was selected, the communication specifying a location of the selected representation within the desktop, and the proxy employs the location included in the communication to identify the local application and cause the local application to be launched on the computing device; and wherein the user interface content further includes a representation of content to which the user has access, and wherein, in response to the representation of the content to which the user has access being selected, the web application is configured to send a second communication to the proxy via the communication channel indicating that the representation of the content to which the user has access was selected, and wherein, in response to receiving the second communication, the proxy is configured to generate additional user interface content that includes a representation of one or more files or folders included in the content to which the user has access and to send the additional user interface content to the web application via the communication channel, and wherein the web application is configured to display the additional user interface content as part of the desktop.

2. The computer storage media of claim 1, wherein employing the location included in the communication to identify the local application comprises accessing mappings between zones of the desktop and local applications.

3. The computer storage media of claim 1, wherein the multiple applications include multiple remotely hosted applications.

4. The computer storage media of claim 1, wherein the multiple applications include multiple local applications.

5. The computer storage media of claim 1, wherein the additional user interface content includes a representation of a first file that is associated with a first application, and wherein, in response to the representation of the first file being selected, the web application is configured to cause the first file to be opened within the first application.

6. The computer storage media of claim 1, wherein the communication channel is a web socket.

7. The computer storage media of claim 1, wherein the proxy and the browser are configured to execute in separate secure enclaves.

8. The computer storage media of claim 1, wherein the additional user interface content comprises a web view of the user's content, the web view incorporating content stored in multiple locations.

9. The computer storage media of claim 8, wherein the multiple locations include:
   multiple cloud storage locations; or
   at least one cloud storage location and at least one network or local storage location.

10. The computer storage media of claim 1, wherein the proxy is configured to cast at least a portion of the user interface content to a display device or to another web application.

11. The computer storage media of claim 1, wherein the proxy is configured to dynamically establish a peer-to-peer VPN session.

12. A method for providing a secure software client, the method comprising:
   providing a proxy that executes as a native application on a computing device of a user;
   providing a web application that executes within a browser on the computing device of the user, the web application being configured to communicate with the proxy via a communication channel;
   generating, by the proxy, user interface content defining a desktop that includes multiple representations of respective-multiple applications that the proxy determines the user is allowed to access, the multiple applications including at least one remotely hosted application and at least one local application that is hosted on the computing device, wherein the representation for each of the at least one remotely hosted application includes connection information for the remotely hosted application, wherein the user interface content further includes a representation of content to which the user has access and wherein the user interface content is HTML 5 content;
   receiving, at the web application, the user interface content defining the desktop;
   rendering, by the web application and within the browser, the user interface content to cause the desktop to be displayed in the browser such that the multiple representations of the respective multiple applications and the representation of the content to which the user has access are displayed to the user as part of the desktop;
   detecting, by the web application, first user input to the desktop displayed in the browser, the first user input selecting a first representation of the multiple representations;
   sending, by the web application and to the proxy via the communication channel, one or more communications that identify a location of the first user input within the desktop;
   determining, by the proxy, that the location is associated with the first representation of the multiple representations, the first representation being associated with a first application of the multiple applications, the first application being a local application;
   based on the determination, invoking the first application on the computing device,
   detecting, by the web application, second user input to the desktop displayed in the browser, the second user input selecting a second representation of the multiple representations, the second representation being associated with a second application of the multiple applications, the second application being a remotely hosted application;
   in response to the second user input launching, by the web application, a separate browser window which uses the connection information included in the second representation to display a user interface of the second application within the separate browser window;
   detecting, by the web application, third user input to the desktop displayed in the browser, the third user input selecting the representation of the content to which the user has access;
   sending, by the web application and to the proxy via the communication channel, one or more second communications indicating that the representation of the content to which the user has access was selected;
   in response to receiving the one or more second communications, generating, by the proxy, additional user interface content that includes a representation of one or more files or folders included in the content to which the user has access and sending the additional user interface content to the web application via the communication channel; and in response to receiving the additional user interface content, displaying, by the web application, the additional user interface content as part of the desktop.

13. A system comprising:

a first computing device on which a browser is executed and which a user employs to access a desktop displayed in the browser;

a proxy that is executed natively on the first computing device or on a second computing device; and a web application that is executed in the browser, the web application and the proxy being configured to communicate via a communication channel, the proxy being configured to generate user interface content to represent the desktop and to send the user interface content over the communication channel to the web application to thereby cause the web application to display the desktop within the browser, wherein the user interface content is HTML5 content;

wherein the user interface content defines multiple representations of respective multiple applications that the user is allowed to access, the multiple applications including at least one remotely hosted application and at least one local application that is hosted on the first computing device, wherein the representation for each of the at least one remotely hosted application includes connection information for the remotely hosted application, wherein, in response to the representation of any of the at least one remotely hosted application being selected in the desktop displayed within the browser, the web application launches a separate browser window which uses the connection information included in the selected representation to display a user interface of the respective remotely hosted application within the separate browser window;

wherein, in response to the representation of any of the at least one local application being selected in the desktop displayed within the browser, the web application sends a communication to the proxy via the communication channel indicating that the representation of the local application was selected, the communication specifying a location of the selected representation within the desktop, and the proxy employs the location included in the communication to identify the local application and cause the local application to be launched on the first computing device; and wherein the user interface content further includes a representation of content to which the user has access, and wherein, in response to the representation of the content to which the user has access being selected, the web application is configured to send a second communication to the proxy via the communication channel indicating that the representation of the content to which the user has access was selected, and wherein, in response to receiving the second communication, the proxy is configured to generate additional user interface content that includes a representation of one or more files or folders included in the content to which the user has access and to send the additional user interface content to the web application via the communication channel, and wherein the web application is configured to display the additional user interface content as part of the desktop.

* * * * *